(12) United States Patent
Gliner

(10) Patent No.: US 11,132,830 B2
(45) Date of Patent: Sep. 28, 2021

(54) STATIC VIRTUAL CAMERA POSITIONING

(71) Applicant: Biosense Webster (Israel) Ltd., Yokneam (IL)

(72) Inventor: Vadim Gliner, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 0 days.

(21) Appl. No.: 15/940,593

(22) Filed: Mar. 29, 2018

(65) Prior Publication Data

US 2019/0304167 A1    Oct. 3, 2019

(51) Int. Cl.
| | |
|---|---|
| *G06T 15/20* | (2011.01) |
| *G06T 7/00* | (2017.01) |
| *G06T 15/06* | (2011.01) |
| *G06T 19/00* | (2011.01) |

(52) U.S. Cl.
CPC ............ *G06T 15/20* (2013.01); *G06T 7/0012* (2013.01); *G06T 15/06* (2013.01); *G06T 19/00* (2013.01); *G06T 19/003* (2013.01); *G06T 2207/10081* (2013.01); *G06T 2207/30196* (2013.01); *G06T 2210/41* (2013.01)

(58) Field of Classification Search
CPC ....... G06T 15/20; G06T 7/0012; G06T 15/06; G06T 2207/10081; G06T 2207/30196
See application file for complete search history.

(56) References Cited

U.S. PATENT DOCUMENTS

| | | | |
|---|---|---|---|
| 2003/0152897 A1* | 8/2003 | Geiger | G06T 15/00 434/262 |
| 2005/0107695 A1* | 5/2005 | Kiraly | G06T 15/06 600/431 |
| 2007/0052724 A1* | 3/2007 | Graham | G06T 19/003 345/620 |
| 2008/0118117 A1 | 5/2008 | Gauldie et al. | |
| 2012/0033105 A1* | 2/2012 | Yoshino | A61B 1/00009 348/239 |
| 2016/0015944 A1* | 1/2016 | Jenkins | A61M 25/09041 604/510 |

OTHER PUBLICATIONS

European Search Report dated Jun. 17, 2019 from corresponding European Patent Application No. 19165885.5.

(Continued)

*Primary Examiner* — Xin Sheng
(74) *Attorney, Agent, or Firm* — Frost Brown Todd LLC

(57) ABSTRACT

Methods, apparatus and computer program products implement embodiments of the present invention that include receiving 3D image data with respect to a 3D region in a living body, the 3D region including a first body cavity having an opening to a second body cavity, and receiving coordinates of a seed location within the first cavity in proximity to the opening. The 3D image data is processed so as to identify, for each ray among a plurality of rays emanating from the seed location at different, respective angles, a respective distance from the seed location to a respective intersection point at which the ray intersects surface tissue in the second cavity. Among the rays, the ray for which the distance from the seed location to the respective intersection point is greatest is selected, and an image is rendered that includes the opening as seen from a location on the selected ray.

20 Claims, 4 Drawing Sheets

(56) References Cited

OTHER PUBLICATIONS

Sumeet, Anand et al., "Virtual Endoscopy of the Nasal Cavity and the Paranasal Sinuses", McGill University, Department of Otolaryngology, Nov. 25, 2011, XP002791712, Retrieved from the Internet: URL:http://cdn.intechweb.org/pdfs/24326.pdf, p. 117

Wikipedia: "Human Nose", May 29, 2019, Retrieved from the internet: URL:https://en.wikipedia.org/wiki/Human_nose.

* cited by examiner

STATIC VIRTUAL CAMERA POSITIONING

CROSS-REFERENCE TO RELATED APPLICATIONS

This application is related to U.S. Patent Application titled "Locating an Opening of a Body Cavity" filed on even date with the present application, which is incorporated herein by reference.

FIELD OF THE INVENTION

The present invention relates generally to image presentation, and specifically to automatic placement of a static virtual camera in order to present a three-dimensional image from a selected vantage point within the image.

BACKGROUND OF THE INVENTION

Some medical procedures are performed using a three-dimensional (3D) image of a patient. One example of a 3D image used in medical procedures is a computed tomography (CT) scan which combines multiple X-ray measurements taken from different angles to produce cross-sectional virtual "slices" of specific areas of a patient, thereby enabling a physician to see inside the patient without a need for surgery.

U.S. Patent Application 2003/0152897, now abandoned, to Geiger describes a method for automatic navigation during a virtual endoscopy, by navigating a viewpoint of a virtual endoscope in a lumen of a structure. The method includes determining an initial viewpoint of the virtual endoscope, and determining a longest ray from the initial viewpoint to the lumen.

U.S. Patent Application 2008/0118117, issued as U.S. Pat. No. 7,853,058 on Dec. 14, 2010, to Gauldie et al., describes a method for orienting a virtual camera for rendering a virtual endoscopy image of a lumen in a biological structure. The method includes calculating suitable paths that avoid a wall in the lumen by using ray casting to find the longest ray from a camera position to the wall.

U.S. Patent Application 2007/0052724, issued as U.S. Pat. No. 7,623,900 on Nov. 24, 2009, to Graham et al., describes a method for navigating along a biological object with a lumen represented by a three-dimensional volume data set. The method includes generating a multiple navigation segments connectable in a sequence, casting groups of rays outwards from the start point of the segment to the object wall to determine respective directions of each segment, and calculating an average ray length for each of the groups.

The description above is presented as a general overview of related art in this field and should not be construed as an admission that any of the information it contains constitutes prior art against the present patent application.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

SUMMARY OF THE INVENTION

There is provided, in accordance with an embodiment of the present invention a method for rendering an image, including receiving three-dimensional (3D) image data with respect to a 3D region in a living body, the 3D region including a first body cavity having an opening to a second body cavity, receiving coordinates of a seed location within the first body cavity in proximity to the opening to the second body cavity, processing the 3D image data so as to identify, for each ray among a plurality of rays emanating from the seed location at different, respective angles, a respective distance from the seed location to a respective intersection point at which the ray intersects surface tissue in the second body cavity, selecting the ray, among the plurality of rays, for which the distance from the seed location to the respective intersection point is greatest, and rendering, on a display screen, an image that includes, based on the 3D image data, the opening as seen from a location on the selected ray.

In some embodiments, receiving the 3D image data includes receiving a computed tomography scan. In additional embodiments, receiving the coordinates of the seed location includes receiving one or more signals from an input device. In further embodiments, receiving the coordinates of the seed location includes analyzing the 3D image data to determine the coordinates for the seed location.

In further embodiments, processing the 3D image data includes generating the rays toward the second body cavity. In some embodiments, rendering an image includes presenting a two-dimensional slice of the 3D image data. In additional embodiments, the first body cavity may include a sinus passageway, wherein the second body cavity may include a sinus cavity, and wherein the opening may include a sinus opening. In further embodiments, the location on the selected ray includes the intersection point of the selected ray.

There is also provided, in accordance with an embodiment of the present invention an apparatus for rendering an image, including a display screen, and a processor configured to receive three-dimensional (3D) image data with respect to a 3D region in a living body, the 3D region including a first body cavity having an opening to a second body cavity, to receive coordinates of a seed location within the first body cavity in proximity to the opening to the second body cavity, to process the 3D image data so as to identify, for each ray among a plurality of rays emanating from the seed location at different, respective angles, a respective distance from the seed location to a respective intersection point at which the ray intersects surface tissue in the second body cavity, to select the ray, among the plurality of rays, for which the distance from the seed location to the respective intersection point is greatest, and to render, on the display screen, an image that includes, based on the 3D image data, the opening as seen from a location on the selected ray.

There is further provided, in accordance with an embodiment of the present invention, computer software product, the product including a non-transitory computer-readable medium, in which program instructions are stored, which instructions, when read by a computer, cause the computer to receive three-dimensional (3D) image data with respect to a 3D region in a living body, the 3D region including a first body cavity having an opening to a second body cavity, to receive coordinates of a seed location within the first body cavity in proximity to the opening to the second body cavity, to process the 3D image data so as to identify, for each ray among a plurality of rays emanating from the seed location at different, respective angles, a respective distance from the seed location to a respective intersection point at which the ray intersects surface tissue in the second body cavity, to select the ray, among the plurality of rays, for which the distance from the seed location to the respective intersection point is greatest, and to render, on a display screen, an image that includes, based on the 3D image data, the opening as seen from a location on the selected ray.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Three-dimensional (3D) images, such as computed tomography (CT) images, can be used help physician view one or more body cavities in a patient before or during a medical procedure. The 3D images enable the body cavities to be viewed from different vantage points. These vantage points may also be referred to as "virtual cameras" that can be placed at different locations in the patient.

Some otorhinolaryngological (ENT) procedures involve navigation of a guidewire through a narrow sinus opening. Before or during these procedures, it may be difficult for a physician to accurately place a virtual camera at a position that can observe the narrow opening (i.e., in order to provide a visual guide to the physician while maneuvering the guidewire into the opening). Reasons for this difficulty include:

The sinus openings are typically small and/or narrow.
The CT images that are used are two-dimensional (2D) slices/projections, whereas the virtual camera needs to be placed in a 3D coordinate system.
The physician typically has very little time to try to adjust the position and orientation of the camera.

Embodiments of the present invention provide methods and systems for automatically placing a virtual camera in a patient, thereby enabling an image to be rendered from the vantage point of the virtual camera's location. As described hereinbelow, three-dimensional (3D) image data with respect to a 3D region in a living body is received, the 3D region comprising a first body cavity having an opening to a second body cavity. Subsequent to receiving the 3D image data, coordinates of a seed location within the first body cavity in proximity to the opening to the second body cavity are received, and the 3D image data is processed so as to identify, for each ray among a plurality of rays emanating from the seed location at different, respective angles, a respective distance from the seed location to a respective intersection point at which the ray intersects surface tissue in the second body cavity. Among the plurality of rays, the ray for which the distance from the seed location to the respective intersection point is greatest is selected, and an image that includes, based on the 3D image data, the opening as seen from a location on the selected ray is rendered on a display screen.

System Description

Figure 1:
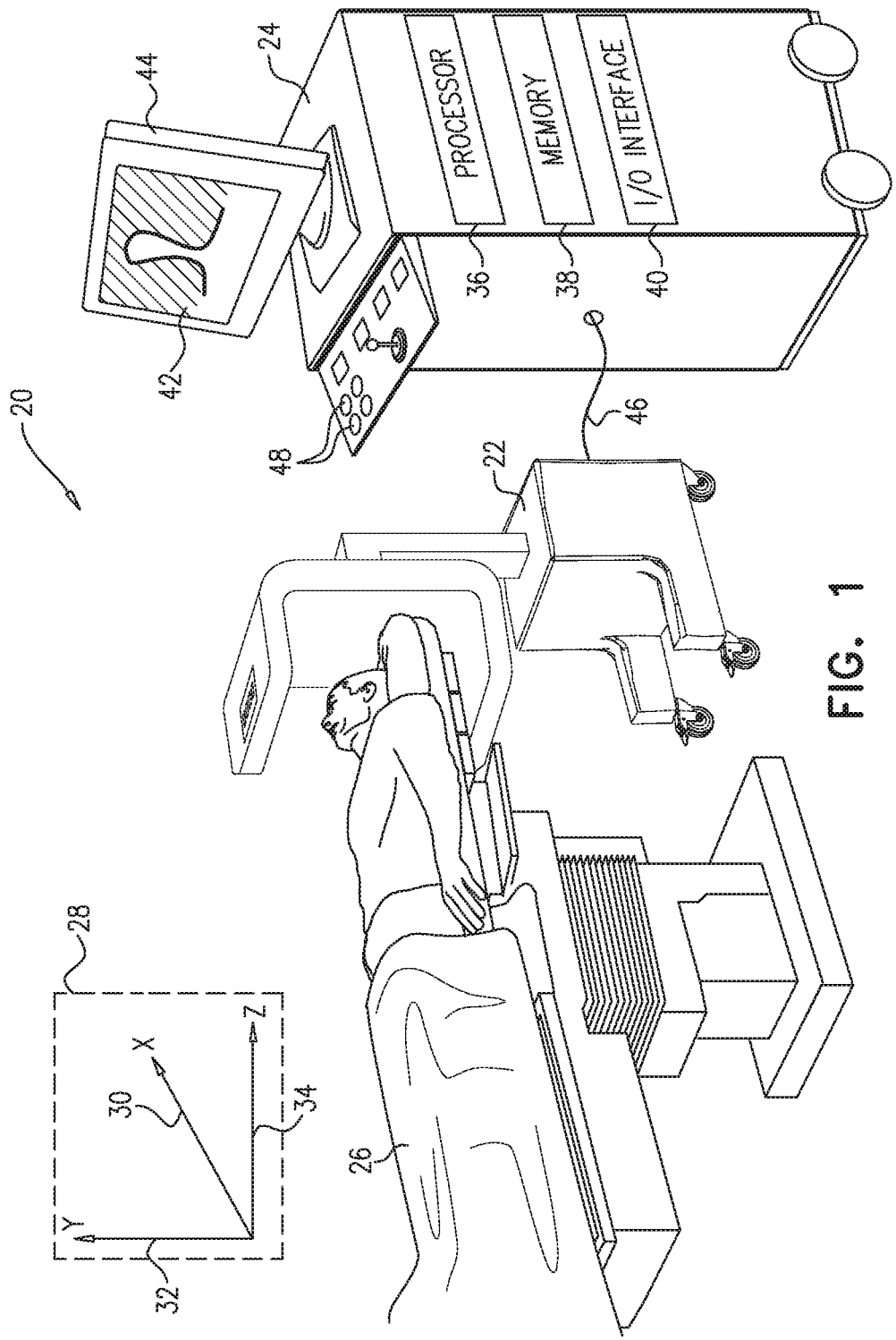
FIG. 1 is a schematic pictorial illustrations of a three-dimensional (3D) medical imaging system configured to automatically place a static virtual camera in a patient, in accordance with an embodiment of the present invention.

FIG. 1 shows a schematic pictorial illustration of a medical imaging system 20 configured to enable automatic static camera positioning, in accordance with an embodiment of the present invention. Medical imaging system 20 comprises a computed tomography (CT) scanner 22 and a control console 24. In embodiments described herein, it is assumed that medical imaging system 20 is used for diagnostic or therapeutic treatment.

Prior to performing an invasive medical procedure on a patient 26, computed tomography scanner 22 generates electrical signals comprising image data for a lumen (e.g., a nasal cavity or a paranasal sinus) of the patient, and conveys the generated image data to control console 24. Computed tomography scanner 22 generates the image data in an image coordinate system 28 comprising an X-axis 30, a Y-axis 32 and a Z-axis 34. The X, Y and Z axes are typically parallel to intersections of the median, coronal, and axial planes of patient 26.

Control console 24 comprises a processor 36, a memory 38 and an input/output (I/O) communications interface 40. In operation, processor 36 uses the received image data to present an image 42 on a display screen 44. Memory 38 stores the image data, and I/O communications interface 40 enables the control console to transfer signals from, and/or transfer signals to CT scanner 22 via a wired connection 46.

Display 44 is assumed, by way of example, to comprise a flat panel display such as a liquid crystal display, a light emitting diode display, an organic light-emitting diode display or a plasma display. However, other display devices can also be employed to implement embodiments of the present invention. In some embodiments, display 44 may comprise a touchscreen that, in addition to presenting image 42, can be configured to accept inputs from an operator (not shown).

In some embodiments, the operator (also referred to herein as a medical professional) can manipulate the image data, typically by presenting images in slices orthogonal to the X, Y, or Z axes on display 44, using one or more input devices 48. In embodiments where display 44 comprises a touchscreen display, the operator can manipulate the image data and a given image slice via the touchscreen display.

Processor 36 typically comprises a general-purpose computer, with suitable front end and additional interface circuits for receiving signals from CT scanner 22 and controlling the other components of control console 24. Processor 36 may be programmed in software to carry out the functions that are described herein. The software may be downloaded to control console 24 in electronic form, over a network, for example, or it may be provided on non-transitory tangible media, such as optical, magnetic or electronic memory media. Alternatively, some or all of the functions of processor 44 may be carried out by dedicated or programmable digital hardware components.

Static Virtual Camera Placement

Figure 2:
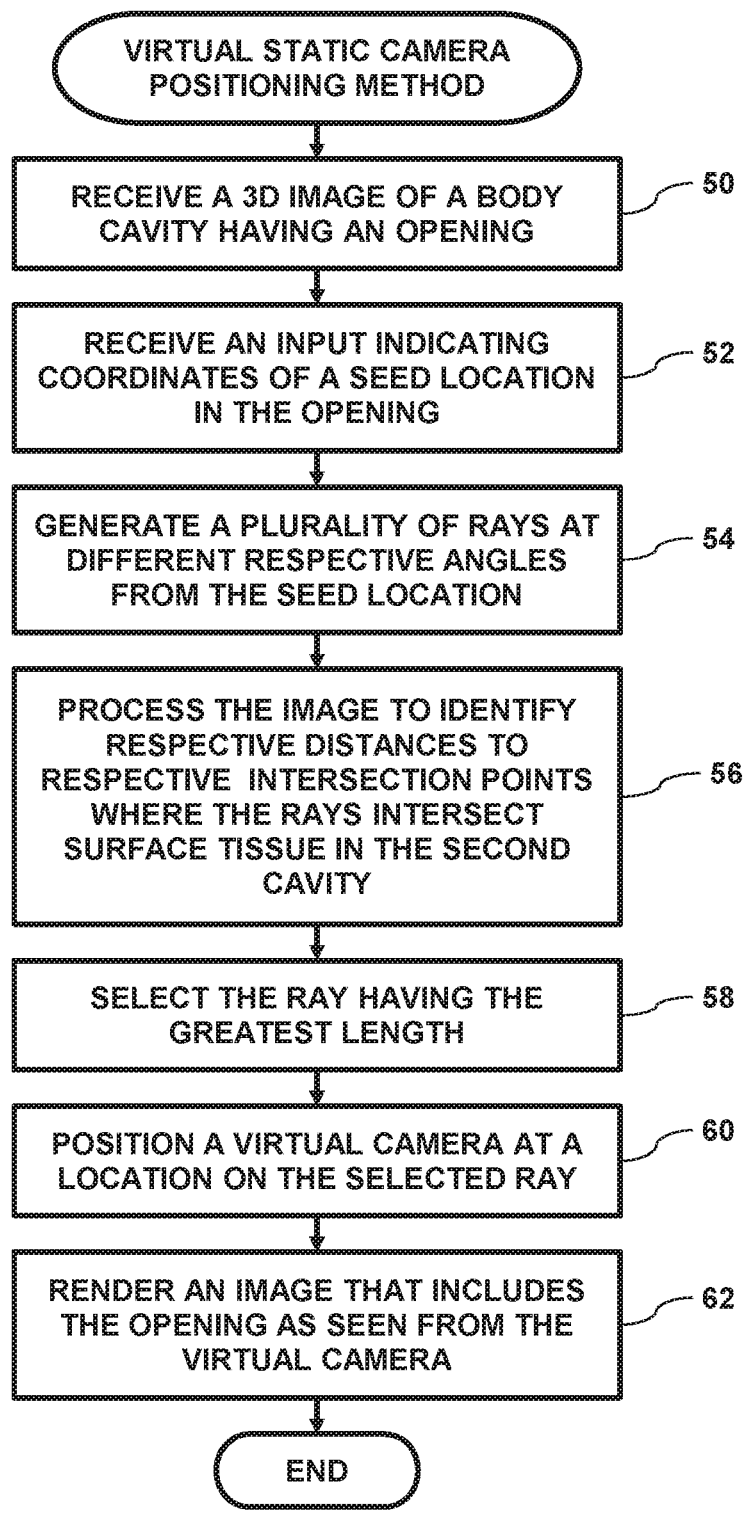
FIG. 2 is a flow diagram that schematically illustrates a method of placing the static virtual camera in a body cavity of the patient, in accordance with an embodiment of the present invention.
Figure 3:
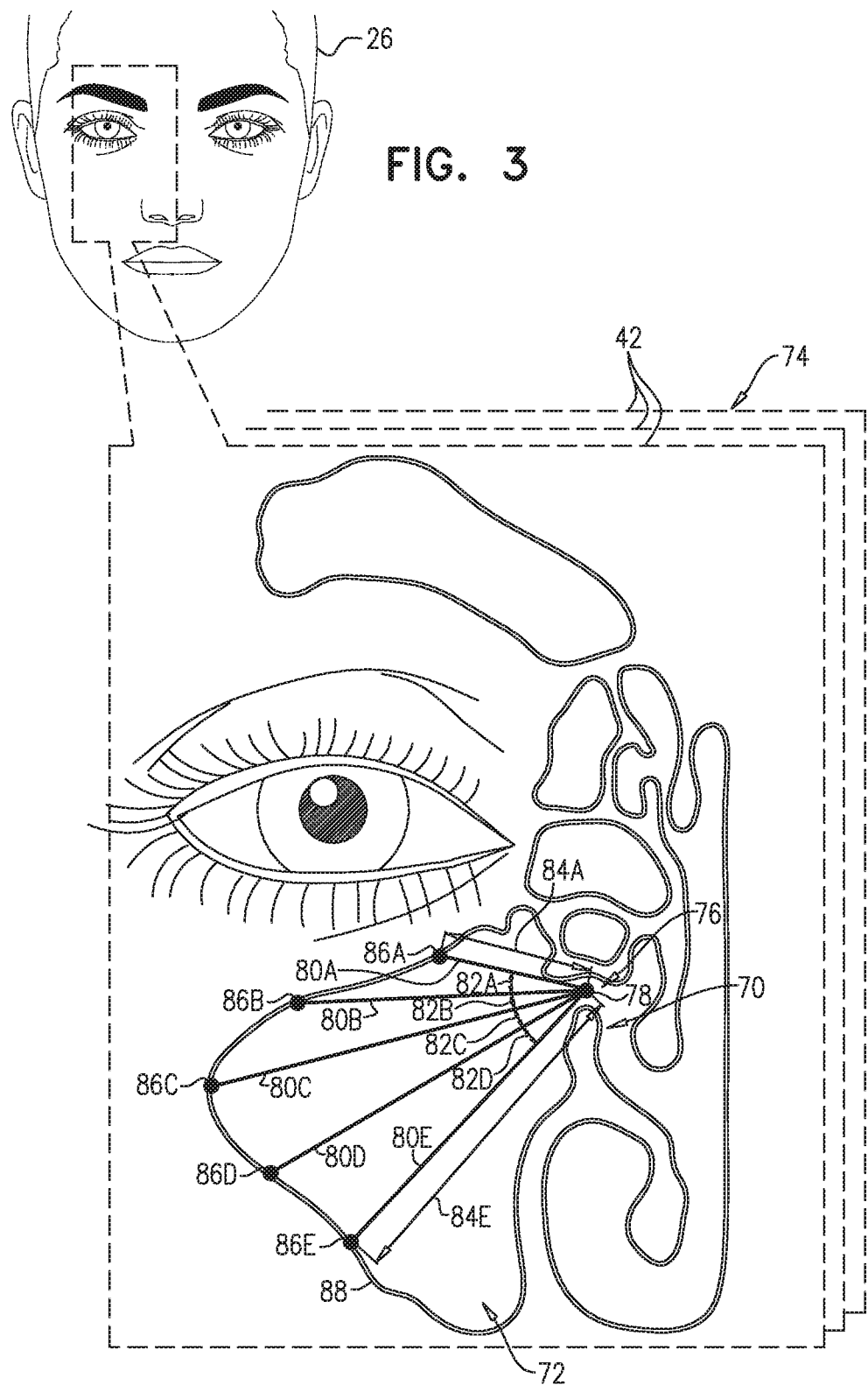
FIG. 3 is a schematic pictorial illustration showing a two-dimensional image of a sinus cavity and a sinus passageway of the patient, in accordance with an embodiment of the present invention.

FIG. 2 is a flow diagram that schematically illustrates a method of positioning a virtual camera in a body cavity of patient 26, and FIG. 3 is a schematic pictorial illustration of a given image slice comprising a sinus passageway 70 (also referred to herein as a first body cavity of the patient) and a sinus cavity (also referred to herein as a second body cavity of the patient), in accordance with an embodiment of the present invention. In a first receive step 50, processor 36 receives 3D image data from a 3D region 74 in patient 26, the 3D region comprising sinus passageway 70 having an opening 76 (also referred to herein as a sinus opening between the sinus cavity and the sinus passageway) to sinus cavity 72. In some embodiments, professor 36 received the 3D image data from CT scanner 22.

In a second receive step 52, processor 36 receives an input indicating a seed location 78 in sinus passageway 70 in proximity to opening 76. In one embodiment, a medical professional manipulates input devices 48 to select the seed location, and processor 36 receives the input from the input devices. In another embodiment, processor analyzes the 3D image data to identify seed location 78. For example, processor 36 can use the growing spheres algorithm described in U.S. Patent Application "Locating an Opening of a Body Cavity" referenced hereinabove.

In a generation step 54, processor 36 generates, toward sinus cavity 72, a plurality of rays 80 emanating from the seed location at different respective angles 82 (i.e., between the rays), and in a processing step 56, the processor processes the 3D image data to identify respective distances 84 to respective intersection points 86 where rays 80 intersect surface tissue 88 in sinus cavity 72. In FIG. 3, rays 80, angles 82 and intersection points 86 can be differentiated by appending a letter to the identifying numeral, so that the rays comprise rays 80A-80E, the angles comprise angles 82A-82D, and intersection points 86 comprise intersection points 86A-86E. While for purposes of visual simplicity FIG. 3 shows distance 84A between seed location 78 and intersection point 86A and distance 84E between the seed location and intersection point 86E, each of the intersection points have corresponding distances 84 to the seed location.

In a selection step 58, processor 36 selects the ray having the longest length. In the example shown in FIG. 3, ray 80C has the longest length.

In a positioning step 60, processor 36 positions a virtual camera at a location on the ray having the longest length (i.e., intersection point 86C). In some embodiments, the location comprises the intersection point for the selected ray having the longest length. Positioning the virtual camera is described in the description referencing FIG. 4 hereinbelow.

Finally, in a rendering step 62, processor 36 renders, on display screen 44, image 42, generated from the 3D image data received in step 50. Image 42 includes opening 76 as seen from the intersection point of the selected ray (i.e., intersection point 86C), and the method ends. Image 42 is typically a two dimensional (2D) image, or alternatively a 3D image formed from a multiplicity of 2D images.

Figure 4:
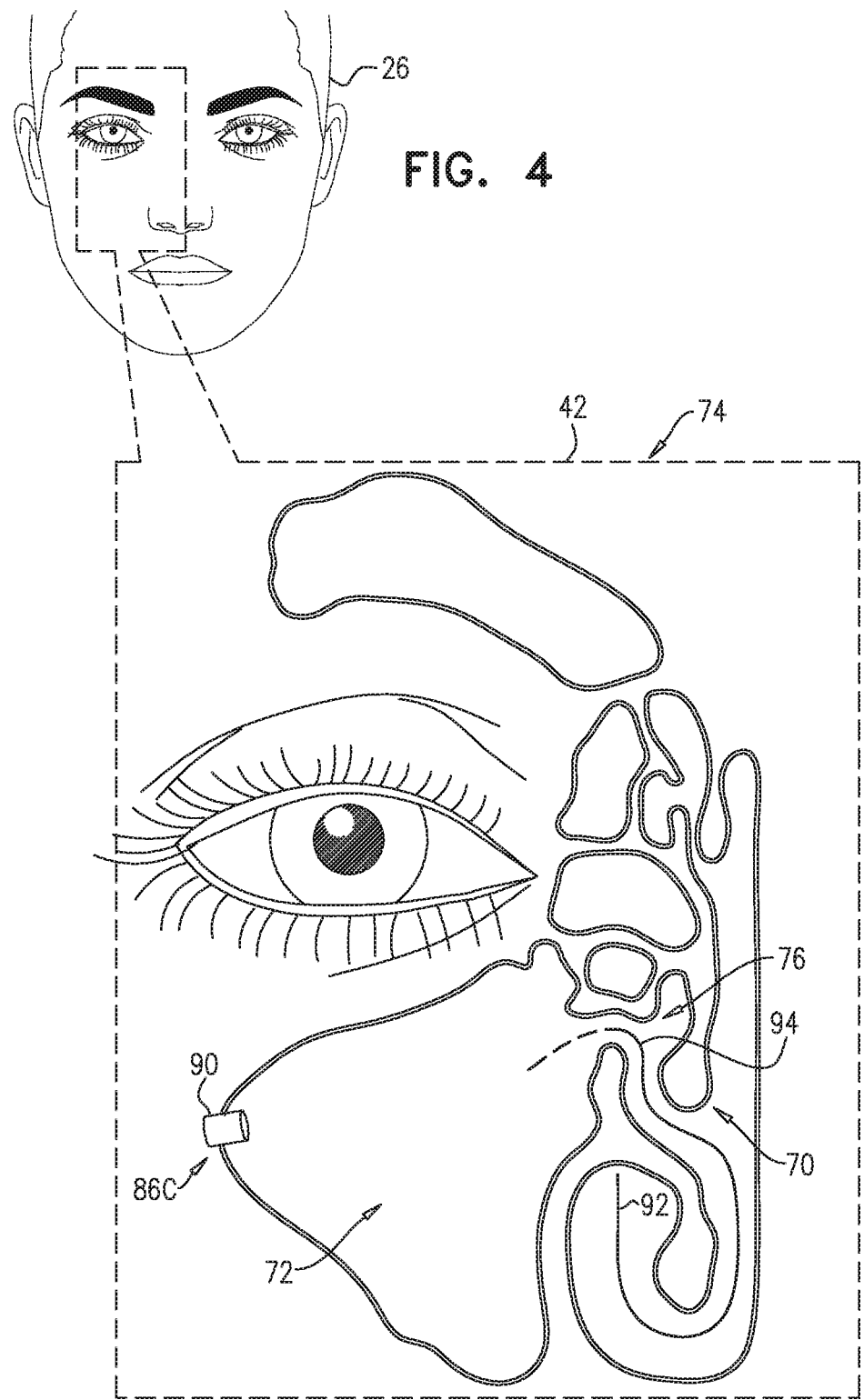
FIG. 4 is a schematic pictorial illustration of the image with the static virtual camera positioned in the sinus cavity, in accordance with an embodiment of the present invention.

FIG. 4 is a schematic pictorial illustration of a virtual camera 90 positioned at intersection point 86C, in accordance with an embodiment of the present invention. By positioning virtual camera 90 at intersection point 86C, processor 36 can process the 3D image data to present, on display screen 44, an image that provides a view of opening 76 from a vantage point comprising intersection point 86C.

In some medical procedures, the medical professional inserts a distal end 94 of a guidewire 92 into sinus cavity 72 via opening 76. To position guidewire 92, the medical professional can first insert distal end 94 near opening 76 in sinus passageway 70, and then use the view of opening 76 (i.e., as seen from virtual camera in image 42) as a real-time visual guide for threading the distal end through the opening into sinus cavity 72.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for rendering an image, comprising:
   (a) receiving three-dimensional (3D) image data with respect to a 3D region in a living body, the 3D region comprising a first body cavity having an opening to a second body cavity;
   (b) receiving coordinates of a seed location within the first body cavity in proximity to the opening to the second body cavity;
   (c) processing the 3D image data so as to identify, for each ray among a plurality of rays emanating from the seed location at different, respective angles, a respective distance from the seed location to a respective intersection point at which the ray intersects surface tissue in the second body cavity;
   (d) selecting the ray, among the plurality of rays, for which the distance from the seed location to the respective intersection point is greatest;
   (e) positioning a virtual static camera on a location of the selected ray, wherein positioning the virtual static camera includes fixing the virtual static camera against movement relative to the second body cavity; and
   (f) rendering, on a display screen, an image that includes, based on the 3D image data, the opening as seen by the virtual camera from the location on the selected ray, wherein the location on the selected ray at which the virtual static camera is positioned comprises the intersection point of the selected ray at which the selected ray intersects the surface tissue in the second body cavity.

2. The method according to claim 1, wherein receiving the 3D image data comprises receiving a computed tomography scan.

3. The method according to claim 1, wherein receiving the coordinates of the seed location comprises receiving one or more signals from an input device.

4. The method according to claim 1, wherein receiving the coordinates of the seed location comprises analyzing the 3D image data to determine the coordinates for the seed location.

5. The method according to claim 1, wherein processing the 3D image data comprises generating the rays toward the second body cavity.

6. The method according to claim 1, wherein rendering an image comprises presenting a two-dimensional slice of the 3D image data.

7. The method according to claim 1, wherein the first body cavity comprises a sinus passageway, wherein the second body cavity comprises a sinus cavity, and wherein the opening comprises a sinus opening between the sinus passageway and the sinus opening.

8. The method according to claim 1, wherein the location on the selected ray at which the virtual static camera is positioned is spaced apart from the seed location.

9. The method according to claim 1, wherein positioning the virtual static camera includes orienting the virtual static camera to face the seed location.

10. The method according to claim 1, wherein the selected ray emanates from the seed location toward the surface tissue in a first direction, wherein positioning the virtual static camera includes orienting the virtual static camera to face a second direction opposite the first direction.

11. The method according to claim 1, further comprising inserting a medical instrument through the opening while maintaining the virtual static camera at the location of the selected ray to thereby visualize the medical instrument passing through the opening.

12. An apparatus for rendering an image, comprising:
   (a) a display screen; and
   (b) a processor configured:
      (i) to receive three-dimensional (3D) image data with respect to a 3D region in a living body, the 3D region comprising a first body cavity having an opening to a second body cavity,
      (ii) to receive coordinates of a seed location within the first body cavity in proximity to the opening to the second body cavity, to process the 3D image data so as to identify, for each ray among a plurality of rays emanating from the seed location at different, respective angles, a respective distance from the seed location to a respective intersection point at which the ray intersects surface tissue in the second body cavity,
      (iii) to select the ray, among the plurality of rays, for which the distance from the seed location to the respective intersection point is greatest,
      (iv) to position a virtual static camera on a location of the selected ray such that the virtual static camera is fixed against movement relative to the second body cavity; and
      (v) to render, on the display screen, an image that includes, based on the 3D image data, the opening as seen by the virtual camera from the location on the selected ray, wherein the location on the selected ray at which the virtual static camera is positioned comprises the intersection point of the selected ray at which the selected ray intersects the surface tissue in the second body cavity.

13. The apparatus according to claim 12, wherein the processor is configured to receive the 3D image data by receiving a computed tomography scan.

14. The apparatus according to claim 12, wherein the processor is configured to receive the coordinates of the seed location by receiving one or more signals from an input device.

15. The apparatus according to claim 12, wherein the processor is configured to receive the coordinates of the seed location by analyzing the 3D image data to determine the coordinates for the seed location.

16. The apparatus according to claim 12, wherein the processor is configured to process the 3D image data by generating the rays toward the second body cavity.

17. The apparatus according to claim 12, wherein the processor is configured to render an image by presenting a two-dimensional slice of the 3D image data.

18. The apparatus according to claim 12, wherein the first body cavity comprises a sinus passageway, wherein the second body cavity comprises a sinus cavity, and wherein the opening comprises a sinus opening between the sinus passageway and the sinus opening.

19. A computer software product, the product comprising a non-transitory computer-readable medium, in which program instructions are stored, which instructions, when read by a computer, cause the computer:
   (a) to receive three-dimensional (3D) image data with respect to a 3D region in a living body, the 3D region comprising a first body cavity having an opening to a second body cavity;
   (b) to receive coordinates of a seed location within the first body cavity in proximity to the opening to the second body cavity;
   (c) to process the 3D image data so as to identify, for each ray among a plurality of rays emanating from the seed location at different, respective angles, a respective distance from the seed location to a respective intersection point at which the ray intersects surface tissue in the second body cavity;
   (d) to select the ray, among the plurality of rays, for which the distance from the seed location to the respective intersection point is greatest;
   (e) to position a virtual static camera on a location of the selected ray such that the virtual static camera is fixed against movement relative to the second body cavity; and
   (f) to render, on the display screen, an image that includes, based on the 3D image data, the opening as seen by the virtual camera from the location on the selected ray, wherein the location on the selected ray at which the virtual static camera is positioned comprises the intersection point of the selected ray at which the selected ray intersects the surface tissue in the second body cavity.

20. A method of performing a medical procedure comprising:
   (a) receiving three-dimensional (3D) image data with respect to a 3D region in a living body, the 3D region comprising a sinus passageway having a sinus opening to a sinus cavity;
   (b) receiving coordinates of a seed location within the sinus passageway in proximity to the sinus opening to the sinus cavity;
   (c) processing the 3D image data so as to identify, for each ray among a plurality of rays emanating from the seed location at different, respective angles, a respective distance from the seed location to a respective intersection point at which the ray intersects surface tissue in the sinus cavity;
   (d) selecting the ray, among the plurality of rays, for which the distance from the seed location to the respective intersection point is greatest;
   (e) fixedly positioning a virtual static camera on a location of the selected ray;
   (f) rendering, on a display screen, an image that includes, based on the 3D image data, the opening as seen by the virtual camera from the location on the selected ray, wherein the location on the selected ray at which the virtual static camera is fixedly positioned comprises the intersection point of the selected ray at which the selected ray intersects the surface tissue in the second body cavity;
   (g) inserting a distal end of a guidewire in the sinus passageway near the sinus opening;
   (h) viewing the sinus opening with the image on the display screen; and (i) threading the distal end of the guidewire through the sinus opening into the sinus cavity while maintaining the virtual static camera fixedly positioned at the location.

* * * * *